United States Patent [19]
Takayanagi et al.

[11] Patent Number: 5,885,638
[45] Date of Patent: *Mar. 23, 1999

[54] ADSORBENT, PROCESS FOR PRODUCING THE SAME, AND METHOD OF TREATING FRUIT JUICE

[75] Inventors: Hiroaki Takayanagi; Hiromi Teshima, both of Kanagawa, Japan

[73] Assignee: Mitsubishi Chemical Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 734,800

[22] Filed: Oct. 23, 1996

[30] Foreign Application Priority Data

Oct. 30, 1995 [JP] Japan ................................. 7-281627

[51] Int. Cl.$^6$ ................ A23C 9/14; C12H 1/04; C12H 1/14
[52] U.S. Cl. .................. 426/271; 426/330; 426/333; 426/599; 426/616
[58] Field of Search .................. 426/330, 330.5, 426/333, 335, 422, 590, 271, 616, 599; 520/1, 2; 521/26–30, 33; 523/406–409, 413, 463; 525/50, 280, 332.2

[56] References Cited

U.S. PATENT DOCUMENTS

| | | | |
|---|---|---|---|
| 4,113,886 | 9/1978 | Katz | 426/422 |
| 4,439,458 | 3/1984 | Puri | 426/330.5 |
| 4,543,365 | 9/1985 | Itagaki et al. . | |
| 4,965,083 | 10/1990 | Norman et al. . | |
| 5,248,321 | 9/1993 | Yang et al. . | |
| 5,266,685 | 11/1993 | Garbutt . | |
| 5,288,307 | 2/1994 | Goltz et al. . | |
| 5,416,124 | 5/1995 | Springfield . | |

FOREIGN PATENT DOCUMENTS 0 388 140  9/1990  European Pat. Off. .

OTHER PUBLICATIONS

Journal of Food Science, vol., 58, No. 4, pp. 801–804, (1993), D.J. Tseng, et al., "Sorption of Ethyl Butyrate and Octanal Constituents of Orange Essence by Polymeric Adsorbents".

Journal of Food Science, vol. 57, No. 1, pp. 186–189, (1992), A. P. Ericson, et al., "Recovery of Grapefruit Oil Constisuents from Processing Waste Water Using Styrene–Divinylbenzene Resins".

Food Technology, Apr. 1990, pp. 130–132, R.F. Matthews, et al., "Removal of Limonin and Naringin from Citrus Juice by Styrene–Divinylbenzene Resins".

*Primary Examiner*—Marian C. Knode
*Assistant Examiner*—Datquan Lee
*Attorney, Agent, or Firm*—Oblon, Spivak, McClelland, Maier & Neustadt, P.C.

[57] ABSTRACT

An adsorbent is described, which has a pore structure suitable for the selective and efficient removal of bitter components from fruit juice, and which does not contain ionic functional groups or the like in the structure thereof and can be easily handle, and more specifically, which comprises a porous crosslinked polymer produced from an aromatic vinyl monomer compound, and in which the specific surface area per dry unit weight, the pore volume per water-wet unit volume, and the specific surface area attributable to pores having a radius not smaller than 50 Å per water-wet unit volume are not smaller than respective specific values. A process for producing the adsorbent and a method of treating fruit juice using the adsorbent are also described.

8 Claims, No Drawings

ADSORBENT, PROCESS FOR PRODUCING THE SAME, AND METHOD OF TREATING FRUIT JUICE

FIELD OF THE INVENTION

The present invention relates to a novel adsorbent, a process for producing the adsorbent, and a method of removing bitterness from fruit juice using the adsorbent.

BACKGROUND OF THE INVENTION

The quality of fruit juice, in particular juice of citrus fruits, varies depending on the kinds of the plants, growing district, harvest, picking time, storage time and method, juicing time, etc. It has hence been difficult to provide a stabilized good flavor by the mere clarification treatment for removing pulp. One method which is currently being conducted for stabilizing the quality of citrus fruit juice is to selectively remove bitter components from the fruit juice. One known technique for carrying out the above method is to bring fruit juice into contact with an adsorbent to adsorb and separate bitter components only. Examples of such bitter components include naringin, which is a representative flavonoid compound. Although limonin, which is a terpenoid compound characteristic of citrus fruits, and the like are also known as other bitter components, the content thereof is very low. Consequently, the main purpose of bitterness removal is to remove naringin. In order for this compound, having a molecular weight of about 500, to be selectively and efficiently removed with an adsorbent, it is necessary to precisely design the hydrophobicity, i.e., chemical structure, and the pore structure of the adsorbent before the adsorbent is synthesized.

An example of bitterness removal with an adsorbent is described in, e.g., *Journal of Food Industry Society of Japan*, Vol 26, No. 1 (1979), pp. 1–5, in which an adsorbent comprising a styrene-divinylbenzene copolymer is used. However, the adsorbent shown in the above reference is not an adsorbent designed and synthesized for bitter-component removal. This prior art adsorbent has a specific surface area of about 700 m$^2$ per g of the dry adsorbent and is unsatisfactory in treating ability. In JP-A-60-153780 (corresponding to U.S. Pat. No. 4,439,458) (the term "JP-A" as used herein means an "unexamined published Japanese patent application") is disclosed a method of bitter-component removal using a styrene-divinylbenzene copolymer. The adsorbent used in this prior art technique also has a specific surface area of from 500 to 700 m$^2$ per g of the dry adsorbent. Further, JP-W-2-503516 (corresponding to U.S. Pat. No. 4,965,083) (the term "JP-W" as used herein means an "unexamined published International patent application based on a Japanese patent application") discloses a method in which a resin produced by post-crosslinking a similar styrene-divinylbenzene copolymer and then incorporating ionexchange groups thereinto to hydrophilize the crosslinked copolymer is used. This prior art resin is disadvantageous in that the process for producing the resin is complicated and involves many steps. In addition, the above resin has drawbacks in practical use in that handling thereof is troublesome, for example, because the resin should be treated with a chemical, e.g., an acid or alkali, before or after use for bitter-component removal since the resin contains ion-exchange groups.

SUMMARY OF THE INVENTION

It is therefore an object of the present invention to provide an adsorbent which can be produced easily and has the excellent ability to remove bitter components. Specifically, the subject of the present invention is to provide an adsorbent which is suitable for the selective and efficient removal of bitter components from fruit juice, and which has a pore structure having a high treating ability and contains no ionic-functional groups or the like so as to be able to be easily handled. The present inventors succeeded in producing an adsorbent which has a hydrophobic chemical structure for hydrophobic adsorption of bitter components onto the adsorbent, a pore volume for facilitating diffusion of the bitter components into inner parts of the adsorbent, and a large specific surface area for efficient adsorption of bitter components. The present invention has thus been completed.

To accomplish the subject described above, the present invention provides an adsorbent comprising a porous crosslinked polymer produced by polymerizing one or more monomers comprising, as a main component, an aromatic vinyl monomer compound, said adsorbent having a specific surface area of 1,200 m$^2$ or larger per g of the dry adsorbent, a pore volume of 0.52 ml or larger per ml of the water-wet adsorbent, and a specific surface area attributable to pores having a radius not smaller than 50 Å of 75 m$^2$ or larger per ml of the water-wet adsorbent. The present invention also provides the adsorbent as described above wherein the aromatic vinyl monomer compound is selected from the group consisting of divinylbenzene or a mixture of divinylbenzene and ethylvinylbenzene.

The present invention further provides a process for producing each of the adsorbents as described above, which comprises suspension polymerizing a monomer mixture comprising, as a main component, an aromatic vinyl monomer compound in the presence of an inert substance which serves to form a micro-pore structure, and bringing the resulting porous crosslinked-polymer beads into contact with a Lewis acid catalyst in the presence of an inert medium.

The present invention furthermore provides a method of treating fruit juice which comprises bringing the fruit juice into contact with each of the adsorbents as described above or a mixture thereof.

DETAILED DESCRIPTION OF THE INVENTION

The present invention is explained below in detail.

The porous crosslinked polymer of which the adsorbent of the present invention is constituted is a polymer produced by polymerizing one or more monomers comprising, as a main component, an aromatic vinyl monomer compound. Various processes for producing porous crosslinked polymers have been disclosed. The porous crosslinked polymer of the present invention can be produced, for example, according to the process for producing a porous matrix for an ion-exchange resin as described in Nobumasa Hojo, "Kirēto Jushi·Ion Kōkan Jushi (Chelate Resin·Ion-exchange Resin)", published by Kodansha (1976).

The essential requirements for the adsorbent in the present invention are that the adsorbent should have a specific surface area of 1,200 m$^2$ or larger per g of the dry adsorbent, a pore volume of 0.52 ml or larger per ml of the water-wet adsorbent, and a specific surface area attributable to pores having a radius not smaller than 50 Å of 75 m$^2$ or larger per ml of the water-wet adsorbent. The adsorbent preferably has a specific surface area of from 1,200 to 3,000 m$^2$ per g of the dry adsorbent, a pore volume of from 0.52 to 1.0 ml per ml of the water-wet adsorbent, and a specific surface area attributable to pores having a radius not smaller than 50 Å of from 75 to 150 m² per ml of the water-wet adsorbent. If any of those properties is outside the range specified above, bitterness cannot be selectively and efficiently removed or such an adsorbent is difficult to produce.

Values of the specific surface area per unit weight of this dry adsorbent (m² per g of the dry adsorbent) were determined by the BET method. Values of the pore volume per unit volume of the water-wet adsorbent and values of the specific surface area attributable to pores having a radius not smaller than 50 Å were determined respectively by multiplying values of integrated pore volume (ml per g of the dry adsorbent) and values of specific surface area (m² per g of the dry adsorbent) both obtained by the BJH (nitrogen adsorption) method by the bulk density of the adsorbent in water (g of the dry adsorbent/ml of the water-wet adsorbent).

The aromatic vinyl monomer compound in the present invention is selected from the group consisting of at least one aromatic monovinyl monomer compound, at least one aromatic polyvinyl monomer compound and a mixture thereof. It is especially preferred that the aromatic vinyl monomer compound comprise from 55 to 100% by weight at least one aromatic polyvinyl monomer compound.

Examples of the aromatic monovinyl monomer compound include styrene, vinyltoluene, ethylvinylbenzene, and vinylbenzyl chloride. Examples of the aromatic polyvinyl monomer compound include divinylbenzene, trivinylbenzene, and divinylnaphthalene. These compounds may be used alone or as a mixture of two or more thereof. An especially preferred aromatic vinyl monomer compound consists of a mixture of from 100 to 55% by weight divinylbenzene and from 0 to 45% by weight ethylvinylbenzene. If desired and necessary, these aromatic vinyl monomer compounds may be used in combination with a small amount of other copolymerizable vinyl monomer compounds such as, e.g., aliphatic vinyl monomer compounds.

The inert substance serving to form a micro-pore structure in the process of the present invention may be any of various substances which are soluble in the aromatic vinyl monomer compound or in a monomer mixture containing the same and are substantially insoluble in water. Examples of such inert substances include aliphatic hydrocarbon compounds such as heptane and octane, aromatic compounds such as benzene, toluene, and xylene, halogenated hydrocarbon compounds such as dichloroethane and chlorobenzene, and linear polymer compounds such as polystyrene. These compounds may be used alone or as a mixture of two or more thereof. Especially preferred of those inert substances is toluene. The amount of the inert substance used in the present invention is from 30 to 300 parts by weight, preferably from 75 to 250 parts by weight, per 100 parts by weight of all vinyl monomer compounds used.

A small amount of a polymerization initiator is added to the vinyl monomer compounds in the presence of the inert substance described above, and the vinyl monomer compounds are polymerized to give a porous crosslinked polymer. Examples of the polymerization initiator include organic peroxides such as benzoyl peroxide and lauroyl peroxide and organic azo compounds such as azobisisobutyronitrile. The polymerization initiator is preferably used in an amount of from 0.01 to 10 parts by weight per 100 parts by weight of all vinyl monomer compounds. The polymerization reaction may be carried out according to a known method for suspension polymerization. The reaction product obtained is washed to give porous crosslinked-polymer beads. Although the thus-obtained polymer beads, even without undergoing any treatment, have abilities sufficient for use as an adsorbent of the present invention, they are subjected to the post-treatment described below according to the adsorbent production process of the present invention. As a result, an adsorbent having an improved bitterness removal ability can be obtained.

The characteristic feature of the adsorbent production process of the present invention resides in that an adsorbent having specific properties is produced by suspension polymerizing a monomer mixture comprising, as a main component, an aromatic vinyl monomer compound in the presence of an inert substance which serves to form a micro-pore structure, and bringing the resulting porous crosslinked-polymer beads into contact with a Lewis acid catalyst in the presence of an inert medium. Contacting the polymer beads with a Lewis acid catalyst to cause a crosslinking reaction in a general manner itself is a known technique as described in JP-A-4-18436.

The inert medium used in the process of the present invention may be a substance by which the polymer beads are wetted and which is inert to the Lewis acid. Examples of the inert medium include halogenated hydrocarbon compounds such as dichloroethane and dichloropropane. These inert media are preferably used in an amount of from 1 to 10 g per g of the polymer beads. The conditions for contact with a Lewis acid catalyst preferably include a temperature of from 50° to 100° C. and a contact period of from 1 to 10 hours. After the contact, the catalyst is deactivated and the polymer beads are then washed to produce the desired adsorbent.

In the process of the present invention, by suitably selecting the production conditions described above, an adsorbent can be produced which has a specific surface area of 1,200 m² or larger per g of the dry adsorbent, a pore volume of 0.52 ml or larger per ml of the water-wet adsorbent, and a specific surface area attributable to pores having a radius not smaller than 50 Å of 75 m² or larger per ml of the water-wet adsorbent. Of the adsorbent particles obtained, those having a particle diameter of from 50 to 2,000 μm are usually used frequently. Especially preferred are adsorbent particles having a particle diameter of from 300 to 1,000 μm. The adsorbent having the properties specified in the present invention is useful for adsorbing and separating various organic compounds present in liquids. In particular, the adsorbent is extremely effective in the removal of bitter components from citrus fruit juice.

The adsorbent according to the present invention can be used in a water-wet state for the removal of bitter components from fruit juice. This treatment can be conducted, for example, by the batch method in which the adsorbent is introduced into a vessel containing fruit juice to contact the adsorbent with the juice, or by the continuous method in which fruit juice is continuously passed through a column type contacting apparatus packed with the adsorbent. The adsorbent which has deteriorated as a result of use in the treatment is regenerated by bringing the adsorbent into contact with hot water or a water-containing alcohol to desorb the adsorbed components. The thus-regenerated adsorbent can be reused for the fruit juice treatment.

Examples of fruit juice from which bitterness can be removed by treatment with the adsorbent of the present invention include juice of citrus fruits such as Chinese citrons, mandarin oranges, grapefruits, oranges, and lemons. The adsorbent of the present invention is suitable for fruit juice containing naringin, limonin, etc. as bitter components. The fruit juice to which the adsorbent of the present invention is applicable is not limited to juice squeezed from those fruits, and the adsorbent is also applicable to fruit juice which has been filtered, concentrated, diluted, heated, stored at a low temperature, or mixed with other fruit juice, etc., or which has been processed by adding chemicals, e.g., sweeteners, refrigerants, acidifiers, nutrient additives, and dispersants.

The present invention will be explained below in more detail by reference to the following Examples, which are representative examples of the process and method of the present invention, and to the following Comparative Example. These Examples are given by way of mere examples, and the present invention should not be construed as being limited to these Examples in any way.

EXAMPLE 1

Divinylbenzene having a purity of 81% and containing ethylvinylbenzene as an impurity was mixed in an amount of 213 g with 372 g of toluene and 2.9 g of dibenzoyl peroxide having a purity of 75%. This mixture was added to 2,050 ml of warm desalted water containing 2.9 g of poly(vinyl alcohol), and suspended therein by stirring. The suspension was heated with stirring to conduct polymerization reaction at 80° C. for 8 hours. The resulting polymer beads were washed with water and dried. To 500 ml of 1,2-dichloroethane were added 100 g of the dry polymer beads. After the polymer beads were allowed to swell in the medium, 10 g of anhydrous iron(III) chloride was added. This mixture was heated and reacted at 80° C. for 8 hours. The beads thus treated were washed to obtain adsorbent I. The specific surface area of adsorbent I was measured with specific surface area meter Flowsorb 2300 (Shimadzu Corp.), and was found to be 1,262 $m^2$ per g of the dry adsorbent. Further, measurement with nitrogen adsorption meter ASAP 2400 (Micromeritics Co.), revealed that adsorbent I had a pore volume per unit volume of the water-wet adsorbent of 0.55 ml per ml of the water-wet adsorbent and a specific surface area attributable to pores having a radius not smaller than 50 Å of 81 $m^2$ per ml of the water-wet adsorbent.

Adsorbent I in a water-wet state (50 ml) was packed into a glass column having an inner diameter of 14 mm, and the column was maintained at 40° C. Desalted water containing naringin (0.75 g/l), citric acid (10 g/l), and sucrose (100 g/l) dissolved therein was passed through the column at 40° C. and a space velocity (SV) of 20 BV/hr. The term "BV" as used herein means a "bed volume". The amount of the solution which had been passed until the concentration of naringin as determined at the column outlet reached 10% of the concentration thereof as determined at the column inlet was measured, and was found to be 74 BV.

EXAMPLE 2

An adsorbent (adsorbent II) was obtained in the same manner as in Example 1, except that the amounts of divinylbenzene, toluene, and dibenzoyl peroxide were changed to 195 g, 391 g, and 2.6 g, respectively. This adsorbent had a specific surface area of 1,301 $m^2$ per g of the dry adsorbent, a pore volume of 0.53 ml per ml of the water-wet adsorbent, and a specific surface area attributable to pores having a radius not smaller than 50 Å of 82 $m^2$ per ml of the water-wet adsorbent. The same naringin solution was passed through adsorbent II in the same manner as in Example 1. As a result, that amount of the solution passed was 77 BV.

COMPARATIVE EXAMPLE 1

Commercial styrene-divinylbenzene copolymer adsorbent "DIAION" HP20 (manufactured by Mitsubishi Chemical Corp.) was analyzed in the same manner as in Example 1. As a result, this adsorbent was found to have a specific surface area of 601 $m^2$ per g of the dry adsorbent, a pore volume of 0.44 ml per ml of the water-wet adsorbent, and a specific surface area attributable to pores having a radius not smaller than 50 Å of 40 $m^2$ per ml of the water-wet adsorbent. The naringin solution was passed through the adsorbent. As a result, that amount of the solution passed was 43 BV.

COMPARATIVE EXAMPLE 2

An adsorbent (adsorbent III) was obtained in the same manner as in Example 1, except that the amounts of divinylbenzene, toluene, and dibenzoyl peroxide were changed to 234 g, 351 g, and 3.1 g, respectively. This adsorbent had a specific surface area of 1,225 $m^2$ per g of the dry adsorbent, a pore volume of 0.50 ml per ml of the water-wet adsorbent, and a specific surface area attributable to pores having a radius not smaller than 50 Å of 77 $m^2$ per ml of the water-wet adsorbent. The same naringin solution was passed through adsorbent III in the same manner as in Example 1. As a result, that amount of the solution passed was 69 BV.

COMPARATIVE EXAMPLE 3

An adsorbent (adsorbent IV) was obtained in the same manner as in Comparative Example 2, except that 12 g of polystyrene was added to the mixture of divinylbenzene, toluene, and dibenzoyl peroxide. This adsorbent had a specific surface area of 1,209 $m^2$ per g of the dry adsorbent, a pore volume of 0.55 ml per ml of the water-wet adsorbent, and a specific surface area attributable to pores having a radius not smaller than 50 Å of 54 $m^2$ per ml of the water-wet adsorbent. The same naringin solution was passed through adsorbent IV in the same manner as in Example 1. As a result, that amount of the solution passed was 69 BV.

The results thus obtained are shown in table below.

| | Surface area $m^2$/g | Pore volume ml/ml | Surface area (>50Å) $m^2$/ml | The amount of the solution passed BV |
|---|---|---|---|---|
| Example 1 | 1262 | 0.55 | 81 | 74 |
| Example 2 | 1301 | 0.53 | 82 | 82 |
| Comparative Example 1 | 601 | 0.44 | 40 | 43 |
| Comparative Example 2 | 1225 | 0.50 | 77 | 69 |
| Comparative Example 3 | 1209 | 0.55 | 54 | 69 |

From the results shown in the above table, it can be seen that the effects of the present invention can not be taken, when an adsorbent does not have a specific surface area of 1,200 $m^2$ or larger per g of the dry adsorbent, a pore volume of 0.52 ml or larger per ml of the water-wet adsorbent, and a specific surface area attributable to pores having a radius not smaller than 50 Å of 75 $m^2$ or larger per ml of the water-wet adsorbent, at the same time.

The present invention provides an adsorbent having a pore structure suitable for the selective and efficient removal of bitter components from fruit juice, a process for producing the adsorbent, and a method of treating fruit juice using the adsorbent.

While the invention has been described in detail and with reference to specific embodiments thereof, it will be apparent to one skilled in the art that various changes and modifications can be made therein without departing from the spirit and scope thereof.

What is claimed is:

1. An adsorbent comprising a porous crosslinked polymer free from ionic functional groups, wherein the polymer is formed by polymerizing an aromatic vinyl monomer, wherein the polymer can exist in the dry state or in the water-wet state, wherein the adsorbent has a specific surface area of at least 1,200 m$^2$ per g of the adsorbent in the dry state, wherein the adsorbent has a specific surface area attributable to pores having a radius of at least 50 Å of at least 75 m$^2$ per ml of the adsorbent in the water-wet state, wherein the adsorbent has a pore volume of at least 0.52 ml per ml of the adsorbent in the water-wet state.

2. The adsorbent of claim 1, wherein the aromatic vinyl monomer is divinylbenzene or a mixture of divinylbenzene and ethylvinylbenzene.

3. A method for producing an adsorbent comprising a porous crosslinked polymer free from ionic functional groups, wherein the polymer is produced by polymerizing an aromatic vinyl monomer, wherein the polymer can exist in the dry state or in the water-wet state, wherein the adsorbent has a specific surface area of at least 1,200 m$^2$ per g of the adsorbent in the dry state, wherein the adsorbent has a specific surface area attributable to pores having a radius of at least 50 Å of at least 75 m$^2$ per ml of the adsorbent in the water-wet state, wherein the adsorbent has a pore volume of at least 0.52 ml per ml of the adsorbent in the water-wet state, wherein the method comprises the steps of:

(a) conducting a suspension polymerization of the aromatic vinyl monomer in the presence of an inert substance, thereby forming the polymer; and (b) contacting the polymer formed in step (a) with a Lewis acid catalyst in an inert medium, thereby producing the adsorbent.

4. The method of claim 3, wherein the aromatic vinyl monomer is divinylbenzene or a mixture of divinylbenzene and ethylvinylbenzene.

5. A method for removing bitter components from a fruit juice comprising the steps of:

(a) contacting the fruit juice with an adsorbent comprising a porous crosslinked polymer free from ionic functional groups, wherein the polymer is formed by polymerizing an aromatic vinyl monomer, wherein the adsorbent can exist in the dry state or in the water-wet state, wherein the adsorbent has a specific surface area of at least 1,200 m$^2$ per g of the adsorbent in the dry state, wherein the adsorbent has a specific surface area attributable to pores having a radius of at least 50 Å of at least 75 m$^2$ per ml of the adsorbent in the water-wet state, wherein the adsorbent has a pore volume of at least 0.52 ml per ml of the adsorbent in the water-wet state; and (b) separating the fruit juice from the adsorbent, thereby removing the bitter components from the fruit juice.

6. The method of claim 5, wherein the aromatic vinyl monomer is divinylbenzene or a mixture of divinylbenzene and ethylvinylbenzene.

7. The method of claim 5, wherein the fruit juice is a citrus fruit juice.

8. The method of claim 6, wherein the fruit juice is a citrus fruit juice.

* * * * *